United States Patent [19]

Lewis et al.

[11] Patent Number: 4,831,523
[45] Date of Patent: May 16, 1989

[54] MULTIPLE DMA CONTROLLER CHIP SEQUENCER

[75] Inventors: Richard P. Lewis, Sandown, N.H.; John A. Klashka, North Andover, Mass.

[73] Assignee: BULL HN Information Systems Inc., Billerica, Mass.

[21] Appl. No.: 239,074

[22] Filed: Aug. 31, 1988

Related U.S. Application Data

[63] Continuation of Ser. No. 925,344, Oct. 31, 1986, abandoned.

[51] Int. Cl.⁴ .................. G06F 13/22; G06F 13/00
[52] U.S. Cl. .................. 364/200; 364/241.1; 364/242.3; 364/242.33
[58] Field of Search ... 364/200 MS File, 900 MS File

[56] References Cited

U.S. PATENT DOCUMENTS

| | | | |
|---|---|---|---|
| 4,017,839 | 4/1977 | Calle et al. | 364/200 |
| 4,067,059 | 1/1978 | Derchak | 364/200 |
| 4,374,416 | 2/1983 | Catiller et al. | 364/200 |
| 4,479,179 | 10/1984 | Dinwiddie, Jr. | 364/200 |
| 4,688,166 | 8/1987 | Schneider | 364/200 |

*Primary Examiner*—Eddie P. Chan
*Attorney, Agent, or Firm*—George Grayson; John S. Solakian; Lewis P. Elbinger

[57] ABSTRACT

A universal peripheral controller is disclosed which uses DMA devices to provide access between a plurality of peripheral devices and other circuits within a computer system. A processor in the computer system recognizes a request from the controller to connect a peripheral via the system bus to another circuit connected thereto and establishes the connection. The processor then passes information to the controller and leaves the task of controlling the transfer of information to the DMA circuitry in the controller. The controller has a sequencer which examines each of the plurality of peripherals connected to it in a round robin operation to determine which peripherals are requesting a connection via the computer system bus to transfer information. The sequencer limits the time each peripheral can be connected to the system bus before servicing another peripheral request in order that all peripherals have equal access to the system bus.

9 Claims, 9 Drawing Sheets

MULTIPLE DMA CONTROLLER CHIP SEQUENCER

This is a continuation of copending application Ser. No. 06/925,344 filed on Oct. 31, 1986, now abandoned.

RELATED CASES

The following patent applications, which are assigned to the same assignee as the instant application, are related to the instant application:

1. System Management Apparatus for a Multiprocessor System, invented by George J. Barlow, Elmer W. Carroll, James W. Keeley, Wallace A. Martland, Victor M. Morganti, Arthur Peters an Richard C. Zelley, Ser. No. 869,164, Filed May 30, 1986.

2. Universal Peripheral Controller Self-Configuring Bootloadable Ramware, invented by John A. Klashka, Sidney L. Kaufman, Krzysztof A. Kowal, Richard P. Lewis, John L. McNamara, Jr., and Susan L. Raisebeck, Ser. No. 925,431, Filed May 31, 1986, now U.S. Pat. No. 4,803,623.

BACKGROUND OF THE INVENTION

1. Field of the Invention

This invention relates generally to data processing systems having data processing operations provided over a common input/output bus, and more particularly with a universal peripheral controller for controlling various types of peripherals coupled to the bus.

2. Description of the Prior Art

Many data processing systems include a common bus to which a plurality of units are connected for the transfer of information. The bus permits any two units to communicate with each other at a given time via a common (shared) signal path. Any unit wishing to communicate, requests the bus cycle. When that bus cycle is granted, that unit becomes the master and may address any other unit in the system as the slave. Most transfers are in the direction of a master to a slave. Some types of bus interchange require a response cycle (read memory, for example). In cases where a response cycle is required, the requester assumes the role of the master, indicates a response is required, and identifies itself to the slave. When the required information becomes available (depending on slave response time), the slave now assumes the role of the master and initiates a transfer to the requesting unit. This completes the interchange which has taken two bus cycles. Intervening time on the bus between these two cycles may be used for other system traffic not involving these two units.

A master may address any other unit on the bus as a slave. It does this by placing the slave address on the address leads. There may be 24 address leads, for example, which can have either of two interpretations depending on the state of an accompanying control lead, called the memory reference cycle. In essence when the memory is being addressed, the bus enables up to $2^{24}$ bytes to be directly addressed to memory. When units are passing control information, data or interrupts, they address each other by a channel number. The channel number allows up to $2^{10}$ channels to be addressed by the bus. Along with the channel number a 6 bit function code is passed which specifies which up to $2^6$ possible functions this transfer implies.

Figure 1:
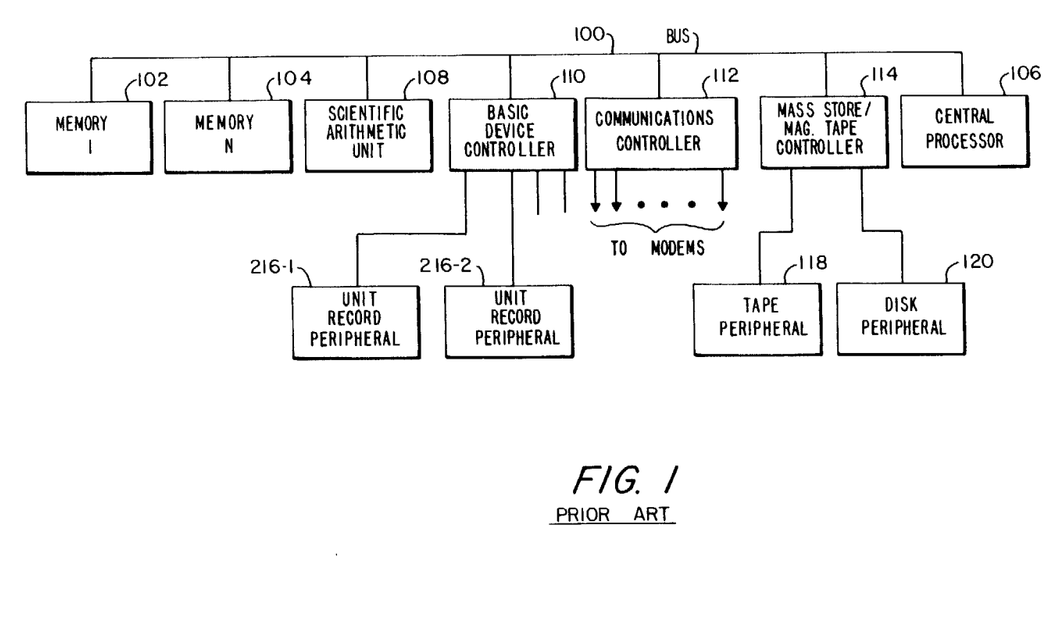
FIG. 1 is a schematic drawing of a prior art computer system utilizing a bus architecture.

A typical prior art data processing system utilizing a bus is shown on FIG. 1. A multiline bus 100 coupled with memory 1 102 to memory N 104, such memories having the highest priority and with the central processor 106 having the lowest priority. Also connected on the bus may be included, for example, a scientific-arithmetic unit 108 and various controllers 110, 112, 114. Controller 110 may be coupled to control, for example, 4 unit record peripheral devices 216. Controller 112 may be used to provide communication control via modem devices; whereas controller 114 may be utilized to control mass storage devices, such as a tape peripheral device 118 and a disk peripheral device 120. Any one of the devices coupled with the bus 100 may address a memory or any other unit connected to the bus. Thus tape peripheral 118 may, via controller 114, address memory 102. Each of such units directly connected to bus 100 includes a tie-breaking logic in the event that two units request simultaneous service to the bus further.

A channel number exists for every end point in the particular system with the exception of the memory type processing elements which are identified by the memory address. A channel number is assigned for each such device. Full duplex devices, as well as half duplex devices, utilize two channel numbers. Output only or input only devices use only one channel number each. Channel numbers are easily variable and accordingly one or more hexidecimal rotary switches (thumb wheel switches) may be utilized for each such unit or devices connected to the bus to indicate a devices address. Thus when a system is configured, the channel number may be designated for each particular unit or device connected to the bus, as may be appropriate for that particular system. Units with multiple inputs/outputs generally will require a block of consecutive channel numbers By way of example, a 4 port unit may use rotary switches to assign the upper 7 bits of a channel number and may use the lower order 3 bits thereof to define the port number to distinguish input ports from output ports. The channel number of the slave unit will appear on the address bus for all non-memory transfers. Each unit compares that number with its own internally stored number (internally stored by means of the rotary switches). The unit which achieves a comparison match is, by definition, the slave, and must respond to that cycle. Generally, no two points in a single system will be assigned to the same channel number. The function codes may designate output or input operations. All odd function codes designate output transfers (write), while all even function codes designate input transfer requests (read). The central processor examines the least significant bit of a 6 bit function code field for an input/output command and uses a bus lead to designate the direction.

A unique device identification number is assigned to every different type of device or unit which is connected to the bus. This number is presented on the bus in response to the input function command, entitled input device identification.

A unit wishing to interrupt the central processor requests the bus cycle. When this bus cycle is granted, the unit places its interrupt vector on the bus, the interrupt vector includes the channel number of the central processor and the interrupt level number. The unit thus provides, as its interrupt vector, the master's channel number and its interrupt level number. If this is the central processor's channel number, the central processor will accept the interrupt if the level presented is numerically smaller than the current internal central processor level and if the central processor has not just accepted another interrupt.

In this type of system different units have different priorities in order to obtain bus cycles. For example, the memory has the highest priority and the central processor has the lowest priority, and they reside physically at opposite ends of the bus 100. Other units occupy intermediate positions and have priority which increases relative to their proximity to the memory end of the bus.

More detail is disclosed in regard to the above type of bus system in the following U.S. patents. The subject patents pertain to the proprietary bus system of Honeywell known in the trade as Megabus*.

*Megabus—a trademark of Honeywell Information Systems Inc.

(a) Data Processing System Providing Split-Bus Cycle Operation by Frank V. Cassarino, Jr. et al, issued Dec. 14, 1976, and having U.S. Pat. No. 3,997,896.

(b) Data Processing System Providing Locked Operation of Shared Resources by George J. Barlow et al, issued Dec. 28, 1976 and having U.S. Pat. No. 4,000,485.

(c) Data Processing System Having Distributed Priority Network by George J. Barlow, issued June 14, 1977, and having U.S. Pat. No. 4,030,075.

(d) Data Processing System Having Distributed Priority Network with Logic for Deactivating Information Transfer Requests by George J. Barlow, issued June 20, 1978, and having U.S. Pat. No. 4,096,569.

(e) Apparatus for Processing Data Transfer Requests in a Data Processing System by Frank V. Cassarino, Jr. et al, issued Nov. 23, 1976, and having U.S. Pat. No. 3,993,981.

(f) Data Processing System Having a Data Integrity Technique by George J. Barlow, issued Nov. 30, 1976, and having U.S. Pat. No. 3,995,258.

It can be seen that with this hierarchical bus process system and the diversity of peripheral systems attached to the bus by different types of controllers that it was necessary to have a universal peripheral controller which could control different types of devices, and eliminate the necessity of having different controllers for different peripherals.

Accordingly a new architecture was necessary, so that the controller would provide equal access to all peripherals coupled to the bus and not lock out or deny access to any peripheral because of priority problems. In order that the controller be cheaper yet more efficient it was required that data transfers on the bus be performed autonomously under local control by commercially available direct memory access (DMA) chips once tee Megabus microprocessor (μP) had set up the transfer requirements. In this way the μP would be left free to attend to other tasks while the DMA chips could oversee the transfer of information between devices coupled to the μP. Thus several levels of simultaneity could be achieved for data processors.

One problem that presented itself in achieving this result was the fact that the architecture, in order to provide equal access to the bus by various peripherals required a rotating priority scheme, wherein each port, to which a peripheral device was attached, was to receive up to 4 bytes of information at one given time then proceed to the other ports in round robin fashion. However the commercially available DMA chip has a priority scheme which awards the bus channel to the highest priority channel when both channels presented requests for the bus simultaneously.

OBJECTS OF THE INVENTION

It is a primary object of the invention to provide an improved peripheral controller system.

Another major object of the invention is to provide an improved data processing system having an improved bus architecture.

Still another object of the invention is to provide a universal peripheral controller that can be compatible with different computer architectures.

Yet another object of the invention is to provide a universal peripheral controller that can accommodate the coupling of different types of peripheral devices to the Megabus.

Still a further object of the invention is to provide a universal peripheral controller that will award the bus to peripheral devices on a rotating priority basis.

Yet a further object of the invention is to provide a universal peripheral controller that will permit several levels of simultaneity in the transfer of data on the bus.

SUMMARY OF THE INVENTION

These and other objects of the invention are achieve by providing a method and apparatus that utilizes a round robin technique in the transfer of information between peripheral devices and other devices coupled to the Megabus. The invention allows equal access for each port coupled to a global bus 316, which in turn is coupled to the Megabus 204, 205. The global bus 316 is also coupled to a plurality of ports 309, 311, 322, 323 which have adapters 309a, 311a, 322a and 323a respectively coupled to the ports which are utilized to couple a variety of different types of peripheral devices to the computer system via the UPC 209. Also coupled to the global bus is a plurality of DMA chips 305, 306 for controlling the transfer of information between peripheral devices and other devices on the system.

When a request is made to the μP 301 coupled to the Megabus for access to the Megabus, the μP sets up the necessary paths for a dialog with the medium requesting access an provides the DMA chip controlling the transfer with address and range information. It then proceeds to other tasks while the DMA chip controls the transfer of information in round robin fashion utilizing a DMA chip sequencer 350. The sequencer advances until it finds a channel that has a request. The global bus is then granted to that channel but only to transfer up to 4 bytes. The sequencer methodically advances to tee next port requesting DMA activity and repeats the scenario of a 4 byte transfer.

BRIEF DESCRIPTION OF THE DRAWINGS

The manner in which the apparatus of the present invention is constructed and its mode of operation can best be understood in the light of the following detailed description, together with the accompanying drawings in which.

DESCRIPTION OF A PREFERRED EMBODIMENT OF THE INVENTION

Figure 2:
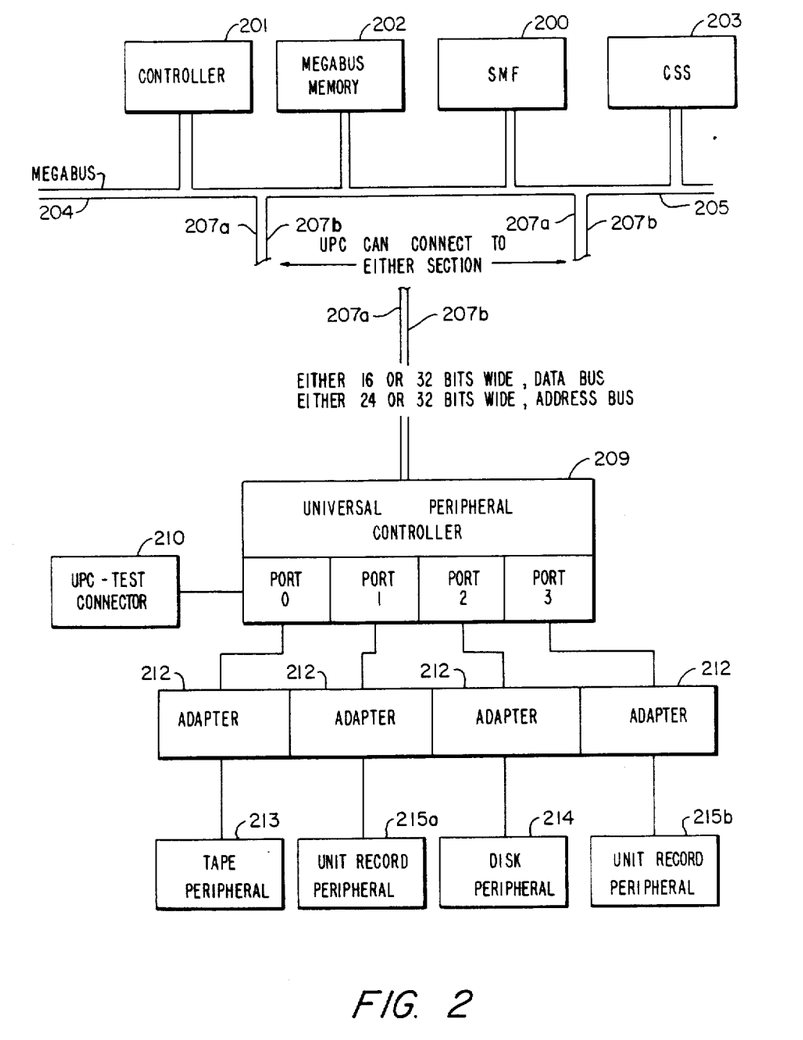
FIG. 2 is a high-level block diagram of the invention.

Referring now to FIG. 2 there is shown a block diagram of the Universal Peripheral Controller Subsystem (UPCS). The UPCS provides a common controller, the universal peripheral controller (UPC) 209 for all Megabus 204, 205 input/output (I/O) configurations with a facility to interface with a variety of peripheral devices.

The UPC permits four simultaneous data transfers as well as peripheral control functions on Not Busy Channels. The UPC supports a high priority, low data rate section of the Megabus 204 or a low priority, high data rate section of the Megabus 205. The UPC can further support either a 16 or 32 bit data bus and either a 24 or 32 address bus.

Coupled to the Megabus 204, 205 are a variety of devices as shown in the above subject patents. Shown on FIG. 2 coupled to the Megabus 204, 205 are typically a controller 201 which includes the system management facility (SMF) 200, a Megabus memory 202 and a central subsystem CSS 203.

The universal peripheral controller 209 can couple to either the high priority, low data rate section of Megabus 204 via a data bus 207a, which may be either 16 or 32 bits wide and an address bus 207b, which may be either 24 or 32 bits wide to provide an interface assembly enabling any Megabus I/O configuration to communicate with UPC/adapter connected peripherals. The UPCS further includes up to 4 peripheral adapters 212, each adapter having one or more channels, allowing a total of up to eight logical channels per UPC. Coupled to the adapters via one controller 209 are typical peripherals, such as tape peripheral 213, disk peripheral 214 and unit record peripherals 215a and 215b. Although not shown in the Figures supra, all adapters provide some data buffering for data rate synchronization and for error detection. Also coupled to the UPC is a RAM expansion 210 which may also be an integral part of the UPC.

Figure 3:
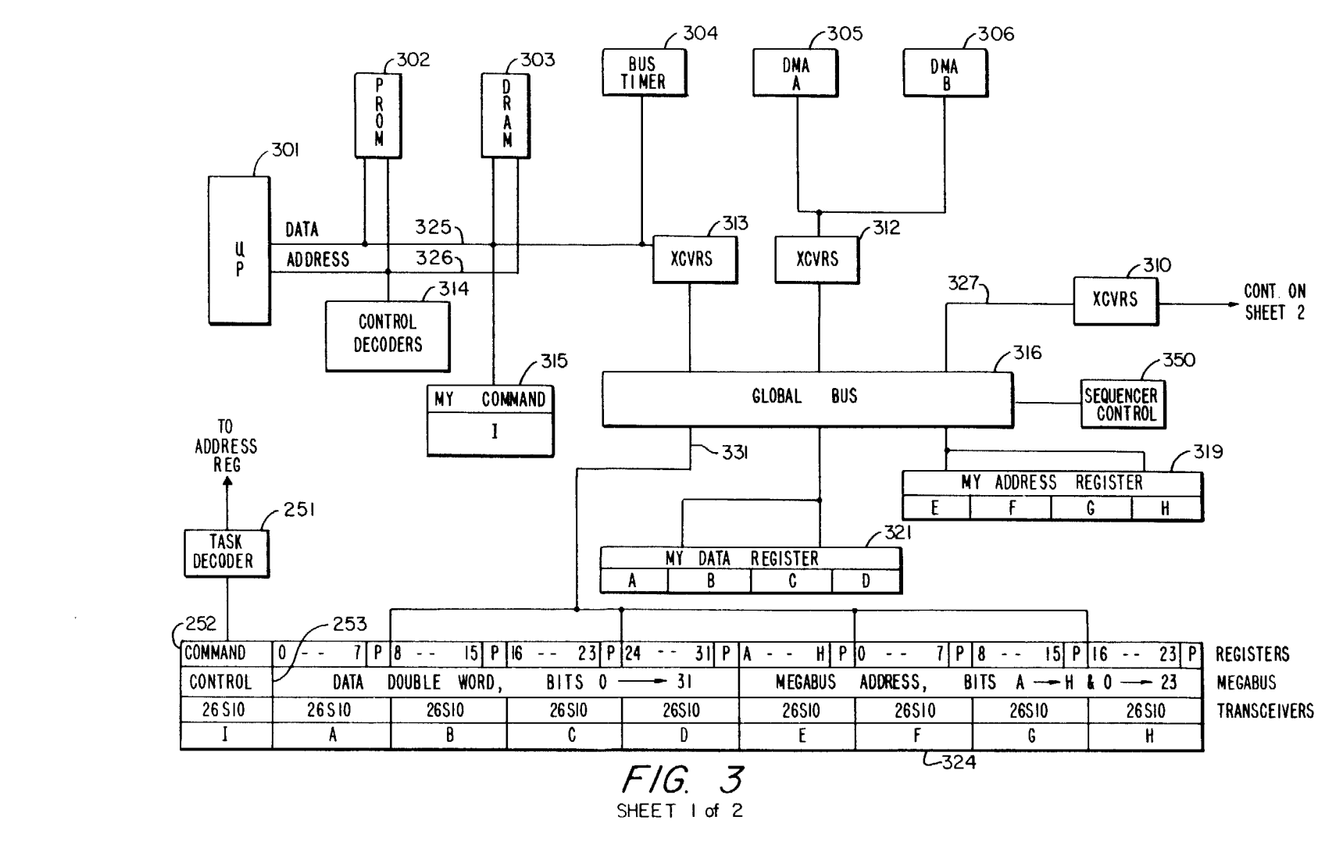
FIG. 3 (2 sheets) is a more detailed block diagram of the invention.

Referring now to FIG. 3 there is shown a more detailed block diagram of the Universal Peripheral Controller. A commercially available Motorola 68000 type microprocessor ($\mu$P) 301 is coupled to internal data and address buses 325, 326 respectively. A commercially available programmable read only memory (PROM) 302 is also coupled to the data and address buses 325, 326 and is also coupled to commercially available control decoders 314. A commercially available dynamic random access memory (DRAM) 303 is further coupled to the data and address bus lines 325, 326 and is further coupled to the MY COMMAND register 315. The DRAM 303 may have storage capacity for at least 64K words and is provided with random logic implementation to refresh information stored therein. A commercially available bus timer 304 is coupled to the data address bus 325 and provides three functions. The first function is to detect if there is no response to a request for the bus and notify the $\mu$P. The second function of the bus timer 304 is to determine if the instruction being executed takes longer than a predetermined value and whether or not it has to abort the execution of the instruction. Finally, the third function of the bus timer 304 is to determine if there is a DMA request cycle which takes longer than a predetermined period and abort that DMA cycle. A global bus 316 is coupled to data and address lines 325, 326, respectively, via a commercially available transceiver 313. The global bus 316 is further coupled to the interface 324 of the Megabus. Additionally the global bus 316 is coupled to ports 309, 311, 322 and 323, respectively, via commercially available transceivers 310 through path 327. Each port 309, 311, 322 and 323 has a respective adapter coupled to it, 309a, 311a, 322a, and 323a. In addition the global bus 316 has MY address register 319 and MY data register 321 coupled to it. These registers 319, 321 each have 4 bytes each. MY data register 321 has bytes A, B, C, D, each 8 bits wide including a parity bit. While MY address register 319 also has 4 bytes E, F, G, H, each 8 bits wide including a parity bit. These bytes and data and address registers 321, 319, respectively, correspond to data and address registers A, B, C, D, and E, F, G, H, located in the Megabus interface 324. Also in the Megabus interface 324 are command registers each having 8 bits including a parity bit, and are each individually and sequentially marked 0---7 P, 8---15 P, etc. Also included in the Megabus interface 324 are commercially available transceivers 26S10.

Also coupled to the global address and data bus 316 are two typical commercially available DMA chips 305, 306 via transceiver 312.

The gist of the peripheral controller is to have the $\mu$P 301 set up the paths for a dialog from a peripheral device requesting service through transceivers 313, global bus 316, Megabus interface 324, transceivers 310, ports 309, 311, 322, 323 and finally through adapters 309a, 311a, 322a, 323a, and on to the specific peripheral devices and to further provide address and range information to the DMA chips 305, 306 via transceiver 313, global bus 316 and transceiver 312. Once the $\mu$P 301 has set up the particular dialog between a given peripheral and another device, it turns over the task of actually performing the transfer of information to one of the DMA devices 305, 306, which then controls a round robbin access to global bus 366 from the various ports 309, 311, 322, 323.

A typical request for service via the Megabus and its subsequent response by the DMA chip controller sequencer system may be accomplished in the following manner. Referring to FIG. 3, when a request is received by the multiple DMA controller system which identifies a channel number of the system, the information is stored in a task decoder 251. The data and the address pertaining to this request will be stored in MY DATA REGISTER 321 and MY ADDRESS REGISTER 319 as they arrive. The task decoder 251 determines the particular ports/channels that this new request is to service. The microprocessor 301 then determines whether or not that particular channel identified by the request is available (i.e., whether it is busy or present) and it will signal RAMWARE* means (not shown) that a request has been received for a particular adapter. (The Ramware means is the subject of another invention assigned to the same assignee as the instant invention and filed on the same date as the instant application and having the title Universal Peripheral Controller Self-Configurating/Bootloadable Ramware, invented by John Klashka et al. It is not necessary to the practice of the instant claimed invention.) The microprocessor 301 will then set up the particular DMA chip 305, 306, that is to handle the request and set up the parameters that the chip will require, such as the starting address, the range address, and other parameters which are not necessary to the practice of this invention. The particular adapter, for example, 309a involved in the transfer is cleared and made ready for transfer of information which is to be read into or out of the adapter buffer memory 380-383 The DMA chip 305, 306, then notifies the Megabus memory 202 (FIG. 2) that it is ready to transfer information into/out of a particular location in memory 202. The information requested from a particular location in memory 202 will be applied to Megabus interface 324 and made available to the UPC 209. As discussed supra, the information available on the Megabus interface 324 will be up to 4 bytes, 32 bits wide. These 32 bits are broken up into 2 word transfers--data words, A, B, C, D, and address words E, F, G, H. Each byte is 9 bits wide comprising a byte 0--7, and a parity bit P. The adapter 309a, 311a, 322a, and 323a may be a byte wide (i.e., 9 bits) or they may be able to access words 18 bits wide. Accordingly for byte transfers, four separate transfer operations are required; whereas with word transfers only two separate operations are required via the DMA chip 305, 306, the MY registers 321, 319, the global data and address bus 316 and transceivers 310. In the case of a byte transfer a typical transfer may be as follows. The cognizant adapter involved in the transfer makes a request which is placed on internal bus 327 via transceivers 310. This request is received by sequence controller 350. (To be described in greater detail infra.) The purpose of the sequencer 350 is to provide equal access to the global bus to all adapters in round-robin fashion rather than granting the global bus to the highest priority unit which could exclude lower priority units from access to the global bus 316 for considerable periods of time The sequencer 350 examines the first adapter 309A to determine whether or not there is any information to be transferred to/from it. If there is information to be transferred to/from adapter 309a, global bus 316 is granted to it and up to 4 bytes are transferred to/from the adapter 309a via its buffer memory 380. The sequence control will then advance to the next adapter 311a which is examined to determine whether or not it has a request for service. If it does, it will be serviced in a similar manner as adapter 309a; if on the other hand it does not have a request for service, the sequencer proceeds round-robin to the other adapters until all the adapters have been examined for service request and serviced, if necessary, wherein the sequence begins all over again.

*Ramware—a trademark of Honeywell Information Systems Inc.

Figure 4:
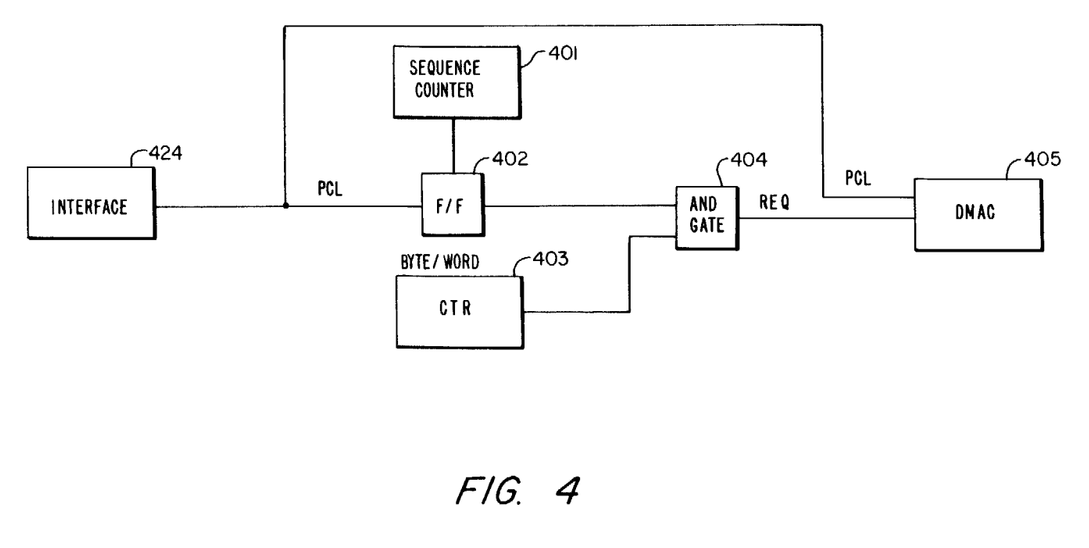
FIG. 4 is a high level block diagram of the DMA chip sequencer of the invention.
Figure 5:
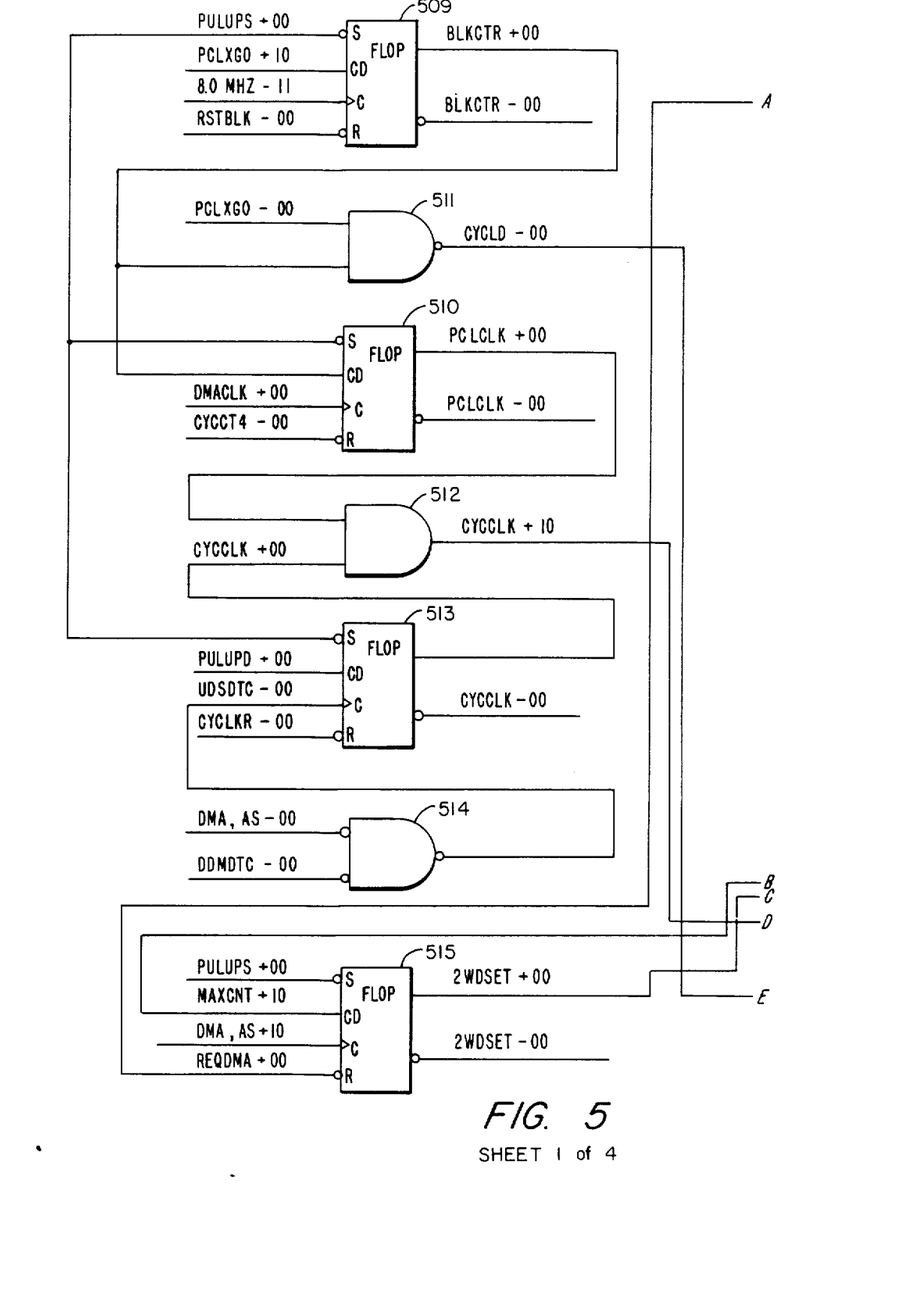
FIG. 5 (4 sheets) is a detailed logic circuit diagram of the invention.

Referring now to FIG. 4 and 5, a detailed description of the DMA controller chip sequencer will be given. FIG. 4 is a high level block diagram of the more detailed logic block diagram of FIG. 5. Sequence counter 401 on FIG. 4, corresponds to sequence counter 501 on FIG. 5. It is a commercially available 74LS169 type of free-running counter that cycles sequentially through the different ports 309, 311, 322, 323. When a port, such as for example 309 on FIG. 3, makes a request for service, it asserts the PCL line coupled to the interface 424. (The interface 424 on FIG. 4 corresponds to interface 324 on FIG. 3.) When the sequencer 401, 501 cycles to port 309 which has made a service request, the flip-flop 402, corresponding to flip-flops 502A and 502D on FIG. 5, is set. This sets latching logic so that a data request may begin. The output of flip-flop 402 is coupled to an input of AND gate 404, corresponding to AND gates 504a-504d on FIG. 5. The output of gate 404 then becomes the request line on the DMAC controller chip 405, also shown as 305 on FIG. 3, and will be henceforth referred to as DMAC. When a request is made to the DMAC, it arbitrates on behalf of that port for the global bus 316 and when it gains access to it, it will begin the transfer of data to/from 309 to/from bus interface 324. The number of bytes or words that are transferred during this cycle of data transfer is controlled by byte/word counter 403. When byte/word counter 403 reaches a maximum predetermined value it controls the request line (REQ) to the DMAC 405 in such a way so that the byte/word transfer is terminated after the last word has been transferred.

Referring now to FIG. 5, the hardware and logic function of a typical data transfer will first be described and then the signal functions on the various gates and logic will be described. In this way undue complication in the description will be minimized.

Counter 501 is a free-running commercially available 74LS169 counter whose outputs are applied to a commercially available 74S139 type decoder 521. There the signals are decoded to generate four separate time request periods that the sequencer will allow for the potential transfer of data from/to any given port. To further simplify the description, we will take a typical transfer of data from a port which will arbitrarily be designated as 0, out of four different ports being numbered 0, 1, 2, and 3. Associated with port 0 will be hardware having a reference numeral followed by the letter "A". For example flip-flop 502B, AND gate 504B and gate 504B or gate 507B are associated with port 1, and so on. In other words any transfer involving hardware designated with an A, B, C, or D after its reference numeral is related to the same port.

When an adapter coupled to port 0 is ready to begin a data transfer sequence, it will assert its peripheral control line PCL. The PCL line is coupled to a commercially available 74AS1832 type gate 507A which is utilized to provide an ANDing function Accordingly when the PCL line is asserted and the sequencer has sequenced to port 0, gate 507A is enabled The output from AND gate 507A is coupled to one input of a 74S20 type AND gate 508 and is utilized to generate a signal for all four ports that indicates that a particular port has made a request. The output of gate 508 is applied to a commercially available 74LS74 type flip-flop 509. Flip-flop 509 then waits until the negative half clock cycle of the master clock is set. (This delayed setting of flip-flop 509 permits signals being propagated and gated further along to settle before the signal from flip-flop 509 is asserted.) A commercially available 74S175 type flip-flop 502A, which acts as a request flip-flop, is then set, thus latching the logic on the board in order to service the port 0 request. The sequencer stops sequencing and the port 0 data transfer can be made. The output of flip-flop 509 also is applied to a 74AS1804 type AND gate 511 and to a 74LS74 type flip-flop 510. Gate 511 is disabled which causes the load enable on a 74S161 type counter 503 to be enabled. Flip-flop 510 waits until its clock from gate 520 is in the next half cycle from the one that set flip-flop 509 and then causes a clock pulse from flip-flop 510 to be applied to a 74AS1832 type gate 512 which then clocks the initial counter value into a 74S161 type counter 503. Counter 503 is clocked according to the size of the data bus of the Megabus. If it is a 16 bit bus, counter 503 will be loaded with a count value that will cause the counter to transfer only 1 or 2 bytes of data; whereas if the data bus is 32 bits wide, the counter will be loaded with a value that will permit 1, 2, 3 or 4 bytes of data to be transferred. The output of counter 503 is then loaded and ready to sequence as a data transfer begins. The output of flip-flop 502A is then applied to AND gate 504A which then generates the request signal to the DMA controller DMAC 305, 306. When the cognizant DMAC recognizes the assertion of its request line for port 0, it then begins a request cycle and then may either request data from the Megabus main memory 202 or collect data from the adapter coupled to port 0 to be sent to main memory 202, depending on whether a read or write transfer is being made. As the bytes or words are transferred, 74AS1832 type AND gate 514 monitors the address strobe control line and the data transfer complete control line The data transfer complete control line is asserted after each byte or word transfer and generates a clocking function to flip-flop 513 which is then fed through gate 512 causing counter 503 to increment as the byte or word is transferred. In the meantime, gate 518 determines if the connected adapter is a word (16 bits) transfer protocol, or if cycle count of 2 is asserted in a byte transfer protocol. When either event is true the gate is asserted. When the true output is ANDed with the cycle count of 1 at gate 517, it indicates that 1 word or 3 bytes have been transferred and the maximum count has been reached. Thus a signal is fed to gate 519 through flip-flop 515 so that at the beginning of the second word of transfer or at the fourth byte of transfer, flip-flop 515 will set. That signal propagates through gate 516, then to gate 504A, which then causes the removal of the request signal from the DMAC. The DMAC will then make the last transfer in the cycle and at the end of that transfer cycle, the DMAC will relinquish control of the global bus and flip-flop 502A is reset when counter 503 reaches its maximum value. The counter hold signal on counter 501 is then removed and the counter will again start sequencing to accommodate the other available resources and permit either the microprocessor 301 to have an opportunity to gain control of the global bus 316 or will cause the other ports on the board to begin a data transfer if their PCL line is asserted.

The signal functions on the gates and logic described supra in reference to FIG. 5 will now be described in detail. A signal CTRLOD+20 is applied to counter 501 at terminal G1 and permits the counter to be loaded with a predetermined value. The signal REQDMA+00 applied to terminal P of counter 501 requests one of the DMA chips 305, 306 on FIG. 3 and indicates that one of the 4 flip-flops 502A-502D has been set and that one of the ports 309, 311, 322, 323 is set to receive/transmit a block of information When this signal is asserted, it will cause counter 501 to stop counting. Signal 68KBR+00 applied to terminal T of counter 501 causes counter 501 to stop counting when it is asserted in order to provide an opportunity for the microprocessor 301 on FIG. 3 to obtain possession of the global bus 316. Signals COUNT1−00, COUNT2+00, and COUNT4+00 are applied to terminals EN, 1 and 2 of decoder 521. When the count 1 signal is true, it indicates that the microprocessor 301 is available to the system and causes the request lines which are at the output terminals 00, 01, 02 and 03 of decoder 521 to be disabled. The inputs to the decoder 521 correspond to count values from the output of counter 501 and indicate, when true, the port that is to be given the opportunity to make a request. There are two control signals DPPCL- and RQ--EN applied to the inputs of gates 507A, 507B, 507C and 507D, respectively. (The dashes in the signal name designation may be substituted by A0, A1, B0, B1 for identifying a particular port and DMA controller.) The DPPCL- signal is asserted at the request of the adapter which will receive/transmit information at that time under control the DMAC 405 through the interface 424 on FIG. 4. The signal RQ--EN is an output of decoder 521 (It should be noted that the outputs of decoder 521 are identified by names which vary in the third and fourth position of their name identifiers ) In the third position there will be either a capital letter "A" or capital letter "B"; whereas in the fourth position there is a "0" or a "1". When an "A" is in the third position, it refers to DMA controller A 305; whereas if a "B" is in the third position, it refers to DMA controller B 306. Moreover the combined third and fourth positions have the following significance. A0 indicates port 0 is to be serviced by DMA 1; where A1 indicates that port 1 is to be serviced by DMA 1. The "B0" in the third and fourth position indicates that port 2 is to be serviced by DMA 2; whereas B1 indicates that port 3 is to be serviced by DMA 2 also.

Gate 508 has the following signals applied to its input terminals: PCL0G0+00, PCL1G0+00, PCL2GO+00 and PCL3GO+00. These signals are utilized to determine when one of the port's PCL line has been asserted and has been allocated a time period on the global bus. The output signal of gate 508 PCLXGO-00 is then asserted and is then applied to flip-flop 509 as one of its inputs which then causes flip-flop 509 to be set. Signal PCLXG0-00 is also applied to AND gate 511. Signal BLKCTR+00 which is an output of flip-flop 509 is also applied to gate 511. When these signals are true, an output signal CYCLD-00 is generated which is then applied to counter 503 at terminal G1 and is the load enable function for counter 503. The output BLKCTR+00 of flip-flop 509 is also applied as one input of flip-flop 510 at input terminal CD. The output CYCLD-00 of gate 511 is also applied as another input to counter 503 at input terminal G1. A clock signal DMACLK+00 generated at gate 520 is also applied as an input for flip-flop 510. This acts as a phasing relationship of the clock to ensure that the request had indeed been sent and was stable before clocking flip-flop 510 and setting it, thus generating a signal PCLCLK+00 which is applied to the input of gate 512 generating a signal CYCLK+10 which is applied to counter 503.

Flip-flops 502A, 502B, 502C and 502D have signals applied to them which are similar and perform similar functions except for different ports. For example, signal PCL0G0-00 applied to the CD terminal of flip-flop 502A is the inverted output of gate 507A. When this is true, flip-flop 502A is clocked with the output BLKCTR+00 of flip-flop 509 which is applied as another input to flip-flop 502A. This generates output signal REQA0-00 which is applied as an input signal to gate 504A. The other input signal to gate 504A CYCCST+00 is generated by gate 516 and is asserted when counter 503 reaches its maximum value. Similarly, gate 518 is used to tell when a word transfer device is attached, or when a byte transfer device has send/received 2 bytes. The output of gate 518 CT2WRD+00 indicating that one word or two bytes have been transferred is applied to the input of gate 517. When signal CYCCT1+00 applied to the other input of gate 517 is true, it indicates that counter 503 has transferred one word of data on a word transfer device or three bytes of data on a byte transfer device. When both these signals are true, an output signal MAXCNT+00 is generated as the output of gate 517 and is fed through gate 519 and is applied as one input to flip-flop 515. This signal is then clocked by another input signal DMA-.AS+10 at terminal C of flip-flop 515. That indicates that a maximum count value has been reached. The output WDSET+00 of flip-flop 515 is applied as one input to gate 516 to generate signal CYCCST+00 and is also applied as one input signal to AND gates 504A, 504B, 504C, and 504D When this occurs, then the request signal from the port having issued the request to the DMA controller chip is removed. The system is then free to service another request made from another port as the sequencer cycles through ports 0, 1, 2 and 3.

While the invention has been particularly shown and described with reference to a preferred embodiment thereof, it will be understood by those skilled in the art that the foregoing and other changes in form and details may be made therein without departing from the spirit and scope of the invention.

Having described the invention, what is claimed as new and novel for which it is desired to secure Letters Patent is:

1. In a computer system comprised of system bus having coupled to it at least one central processing unit (CPU), at least one random access memory (RAM), and a plurality of peripheral units such as at least one unit record peripheral (UP), at least one tape peripheral (TP), and at least one disk peripheral (DP), each communicating with each other by acquiring access to the system bus on a predetermined priority assigned to each unit, a universal peripheral controller (UPC) coupled to said system bus and to said units for controlling the transfer of information between peripheral devices and other devices on the system by controlling access to said system bus on an equal basis regardless of the predetermined assigned priority to each unit, said UPC comprising:

(a) global bus means in said UPC coupled to said system bus;

(b) microprocessor means (up) coupled to said system bus and to said global bus means, said microprocessor means being responsive to requests from requesting units to set up the data paths in said computer system between said requesting and requested units through a plurality of direct memory access means for transfer of information, said microprocessor means providing control information to the plurality of direct memory access means to control transfers of said information between said requesting and requested units by establishing ranges of data to be transferred;

(c) said plurality of direct memory access (DMA) means coupled to said global bus means and responsive to said control information for independently controlling transfer of information to/from the requesting unit and the requested unit;

(d) sequencer means for sequentially identifying individual ones of sad units for DMA transfers;

(e) limiting means for limiting DMA transfers to an amount of data less than the full ranges of data established by the microprocessor means; and (f) means responsive to the sequencer means and the limiting means to enable successive ones of the DMA means for limited transfers from successive units such that the transfer are interleaved.

2. The computer system as recited in claim 1 wherein the sequencer means is connected to said global bus means and cyclically monitors said units to determine if there is information to be transferred to/from them for providing access for said units having information to be transferred to said global bus means for a predetermined period of time for information transfer and wherein each of said units is sequenced in round robin fashion.

3. The computer system as recited in claim 2 including, in said UPC, adapters for coupling said units to said system bus.

4. The computer system as recited in claim 3 including transceiver means for coupling said DMA means to said global bus means.

5. The computer system as recited in claim 4 including data registers for storing data information to be transferred via said DMA means.

6. The computer system as recited in claim 5 including address registers for storing address information to be transferred by said DMA means.

7. The computer system as recited in claim 2 wherein said system bus is comprised of two sections, a high priority low data rate section and a low priority high data rate section and said UPC services both sections.

8. A peripheral controller for accessing peripheral devices in a computer system comprising a system bus having coupled to it at least one central processing unit, at least one random access memory and a plurality of peripheral devices, the peripheral controller being coupled to said system bus and to said peripheral devices for controlling the transfer of information between peripheral devices and other devices on the system bus by controlling access to said system bus, said controller comprising:

a plurality of ports, each for communicating with a peripheral device;

a plurality of direct memory access (DMA) means, each for controlling transfers of data in direct memory accesses through one of the ports;

a microprocessor coupled to the DMA means for establishing DMA data paths, said microprocessor means being responsive to requests from requesting peripheral devices to set up data paths in said computer system between said requesting devices and other devices through a plurality of direct memory access means for transfer of data, said microprocessor means providing control information to the plurality of direct memory access means to control transfers of said data between said devices by establishing ranges of data to be transferred;

sequencer means for sequentially identifying individual ones of said peripheral devices for DMA transfers;

limiting means for limiting DMA transfers to an amount of data less than the full ranges of data established by the microprocessor means; and means responsive to the sequencer means and the limiting means to enable successive ones of the DMA means for limited transfer from successive devices such that the transfers are interleaved.

9. A peripheral controller as claimed in claim 8 further comprising an adapter coupled to each port to buffer data transferred by each DMA means.

* * * * *